Figure 1:
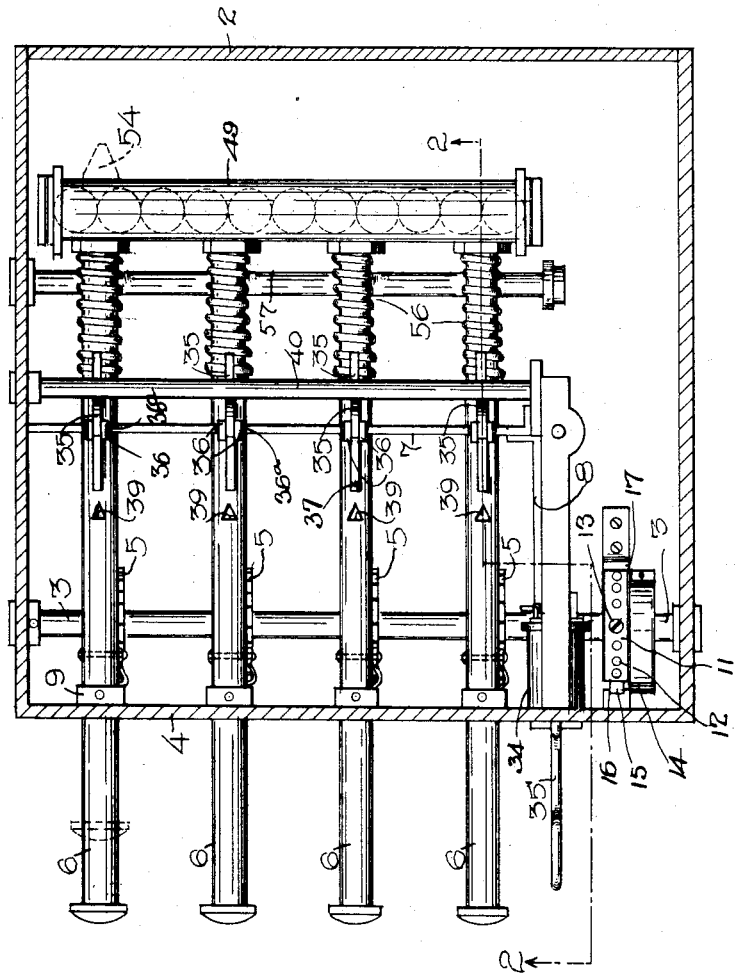

F. SIMPSON.
VOTING MACHINE.
APPLICATION FILED OCT. 7, 1913.

1,219,874.

Patented Mar. 20, 1917.
5 SHEETS—SHEET 1.

Witnesses
C. W. P. Newbold
K. M. Smith

Inventor
Frank Simpson
By
Attorney

F. SIMPSON.
VOTING MACHINE.
APPLICATION FILED OCT. 7, 1913.

1,219,874.

Patented Mar. 20, 1917.
5 SHEETS—SHEET 3.

Witnesses
C. V. P. Newbold
R. M. Smith

Inventor
Frank Simpson
By [signature]
Attorney

F. SIMPSON.
VOTING MACHINE.
APPLICATION FILED OCT. 7, 1913.

1,219,874.

Patented Mar. 20, 1917.
5 SHEETS—SHEET 4.

Witnesses
C. W. P. Newbold
R. M. Smith

Inventor
Frank Simpson
By
Attorney

F. SIMPSON.
VOTING MACHINE.
APPLICATION FILED OCT. 7, 1913.
1,219,874.
Patented Mar. 20, 1917.
5 SHEETS—SHEET 5.
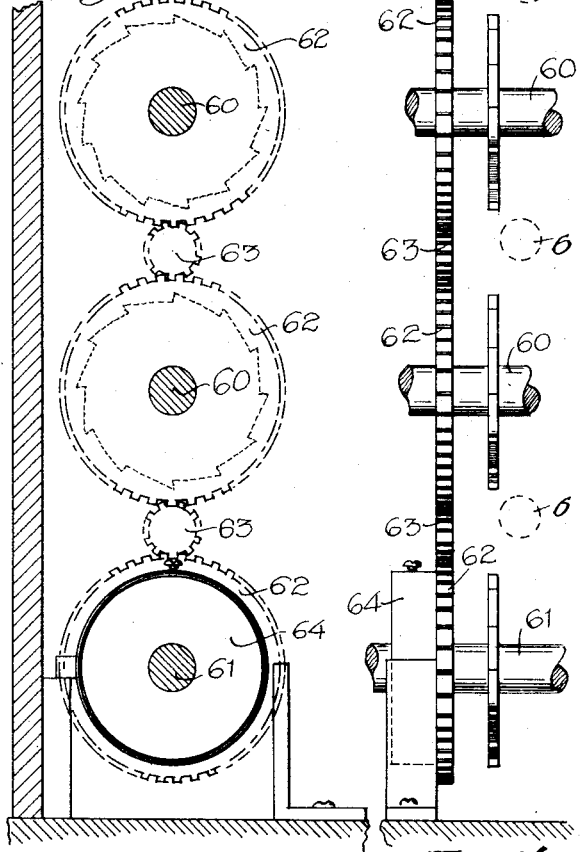
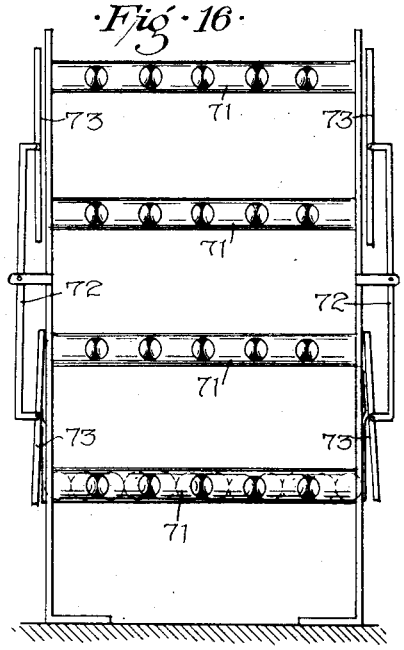
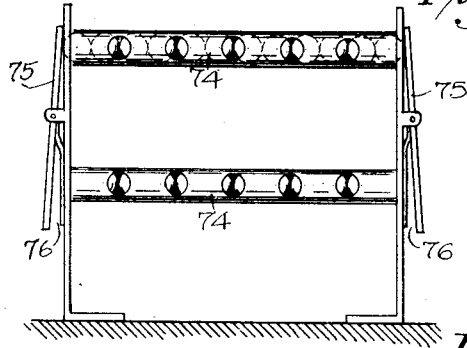
Inventor
Frank Simpson
By ........ Jr.
Attorney
Witnesses
C. V. R. Newbold
R. M. Smith

UNITED STATES PATENT OFFICE.

FRANK SIMPSON, OF LA JOLLA, CALIFORNIA.

VOTING-MACHINE.

1,219,874.   Specification of Letters Patent.   Patented Mar. 20, 1917.

Application filed October 7, 1913.   Serial No. 793,869.

*To all whom it may concern:*

Be it known that I, FRANK SIMPSON, a citizen of the United States, residing at La Jolla, in the county of San Diego and State of California, have invented certain new and useful Improvements in Voting-Machines; and I do hereby declare the following to be a full, clear, and exact description of the invention, such as will enable others skilled in the art to which it appertains to make and use the same.

This invention comprehends improvements in voting machines and relates more particularly to those of the type which are especially adapted to be used under those forms of government known as the commission form and the proportional representative forms.

In the form of government known as proportional representative, each voter can, at his option, cast one vote for each of the candidates up to the number of candidates that he is entitled to vote for, or he can distribute the number of votes to which he is entitled among any number of candidates, not exceeding the number to which he is entitled. Thus, if there are twenty-five candidates and each voter can vote for five, the voter can, at his option, cast one vote for each of five candidates as under the present commission form, or he can cast five votes for one candidate, or two for one, and three for another, or any similar combination, so long as he confines himself as to the number of votes and candidates to the number prescribed by law. This system of voting is not used at present except in a few isolated cases, but is being vigorously advocated and will, without doubt, become popular in the near future.

One of the objects of my invention is to provide a machine so constructed as to admirably adapt itself for use when voting as above described.

Another object of the invention is to provide a voting machine of extremely simple construction, very practical and that is both fool and fraud proof and having a flexibility and capacity for candidates that is practically unlimited.

Another and more specific object of the invention is to provide a machine including a number of name rods having their ends projecting outside of a case and carrying thereon the names or numbers or both of the candidates to be voted for, one rod for each candidate, and each rod operating independently of all other rods; a main shaft, a plurality of ratchet disks rigidly secured thereto, each of the name rods operating one of the ratchet disks, means for locking the main shaft, a stop wheel carried by the main shaft and a plurality of registers operated by the name rods for registering the number of votes cast for each candidate.

Another object of the invention is to provide a voting machine so constructed that it will be necessary for the machine to be unlocked by each voter and by the election official after having been operated by one voter before it can again be used.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 2:
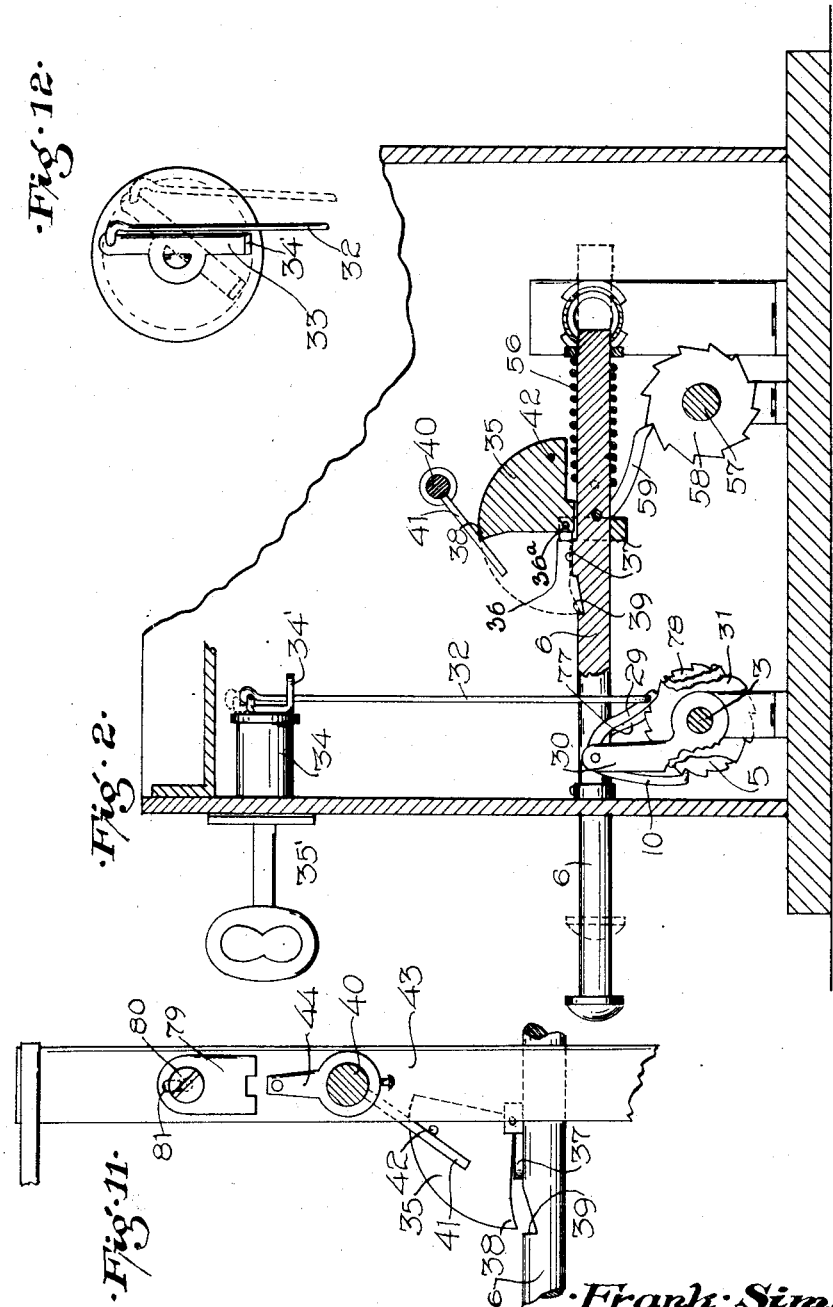
Figure 3:
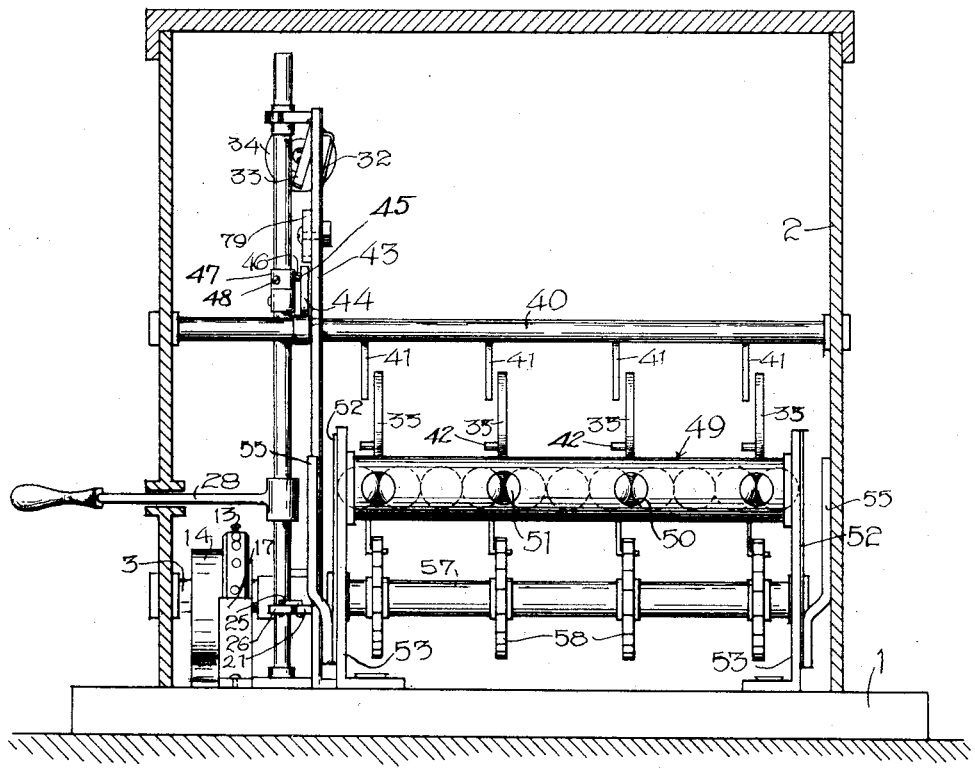
Figures 4, 5:
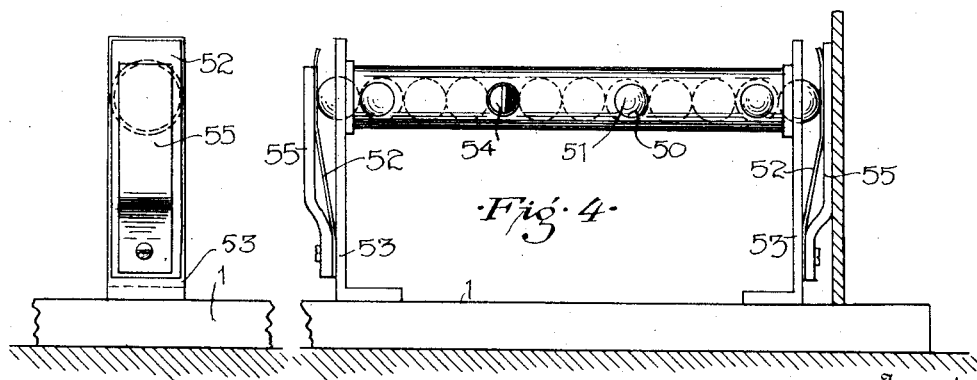
Figure 6:
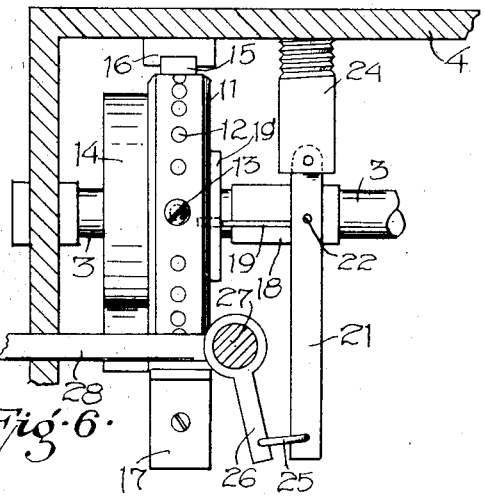
Figure 7:
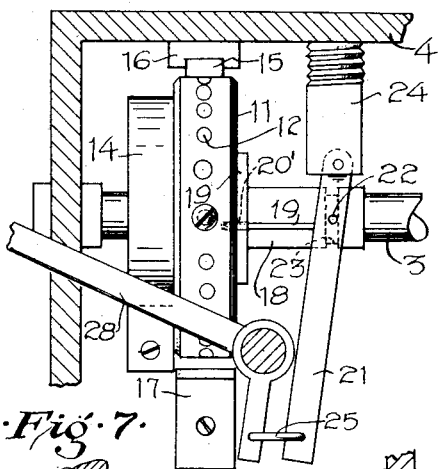
Figure 9:
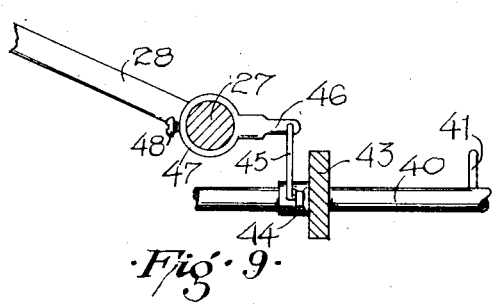
Figure 8:
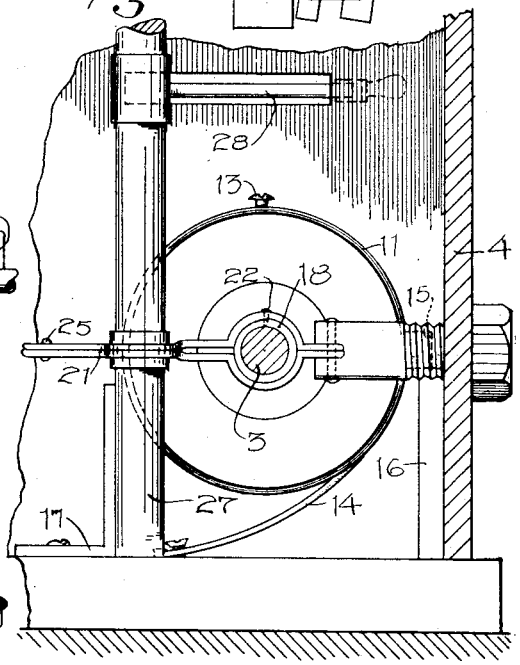
Figure 10:
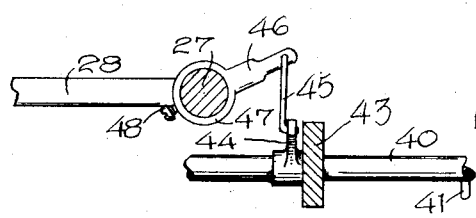

Figure 1 is a top plan view of my improved voting machine with the casing shown in section, Fig. 2 is a vertical sectional view taken on the plane of line 2—2 of Fig. 1, Fig. 3 is a rear elevation of the machine with the casing shown in section, Fig. 4 is a detail side elevation of the ball holding tube and coöperating parts, Fig. 5 is an end elevation of the construction shown in Fig. 4, Fig. 6 is a fragmentary horizontal sectional view showing a portion of the main shaft, the stop wheel carried thereon, the clutch for said wheel and operating means for the clutch, Fig. 7 is a view similar to Fig. 6, showing the clutch in engagement with the stop wheel, Fig. 8 is a fragmentary vertical sectional view through the main shaft, showing the stop wheel, the clutch therefor, and means for operating the latter, Figs. 9 and 10 are fragmentary horizontal sectional views through the vertical shaft, showing a portion of the rock shaft and the release lever in different positions, Fig. 11 is a detail view of the means employed for locking the rock shaft, Fig. 12 is a detail end elevation of the lock for the main shaft, Fig. 13 is a somewhat diagrammatic view illustrating the manner in which a number of series of name rods may be connected so as to cause a movement of any one of said rods to operate the main shaft, Fig. 14 is a view taken on the plane at right angles to Fig. 13, Fig. 15 shows the arrangement of levers employed for engagement with the stop balls when three series of name rods are employed, Fig. 16 shows the arrangement of levers used for holding the stop balls within the tubes when four series of name rods are employed, and Fig. 17 shows the arrangement of levers used for engagement with the stop balls when two series of name rods are used.

Figure 18:
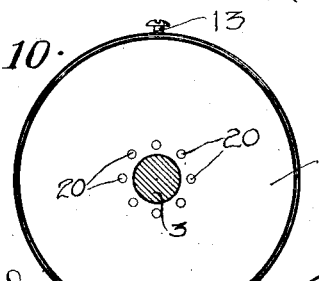

Fig. 18 is a fragmentary side elevation of the stop wheel showing the openings formed in the inner side thereof.

Referring in detail to the drawings by numerals, 1 designates the base of my voting machine and 2 a preferably rectangular casing mounted thereon. This base and casing may, of course, be made of any desired material and of any desired shape or form. The casing will preferably be provided with one or more doors in order that the machine housed therein may be easily reached should it be desired to make repairs or for any other purpose.

A main, or what may be termed a multiple disk shaft 3 is journaled through the casing adjacent the front wall 4 thereof and carries a plurality of ratchet disks 5 rigidly secured thereto. A plurality of name rods 6 corresponding in number to the number of ratchet disks 5 are slidable through the front wall 4 at right angles to and above the main shaft 3. The brace rod 7 which is supported in a horizontal plane by means of the brace 8 is apertured to permit the name rods to slide therethrough and serve as a bearing to support the rear ends of said rods. A stop collar 9 is rigidly secured to each of the name rods for engagement with the inner side of the wall 4 to limit the outward movement of the rods. A depending pawl 10 is pivotally secured at its upper end to each of the name rods 6 and is adapted to engage one of the ratchet disks 5 to impart a rotational movement thereto at each operation of the corresponding name rod 6. It will be noted that the teeth upon the ratchet disks 5 are so formed as to cause the pawl 10 to operatively engage therewith when the name rods are forced inwardly and to allow the pawl to ride freely thereover when the name rods are returned to their outward position.

To limit the number of rotational impulses which each voter may give to the main shaft, I provide a stop wheel 11 which is loosely mounted upon the main shaft adjacent the one end thereof. This wheel is formed with a plurality of peripheral openings 12 in one of which a stop screw 13 may be secured and it is the position of this screw which determines the number of votes which a voter may cast. The stop wheel 11 is formed with a number of openings 12 corresponding to the number of teeth carried by each ratchet disk 5. A coil spring 14 is secured at one end to the stop wheel 11 and at its other end to the base 1 and tends to return the projection 15 formed upon the periphery of the stop wheel 11 into engagement with the stop 16 formed upon the front wall 4 of the case. A stop 17 is provided opposite to the stop 16 for engagement by the stop screw 13. The position of this stop may of course be varied to suit different conditions under which the machine may be used.

To cause a rotation of the main shaft 3 to impart a movement to the stop wheel 11, I provide clutch mechanism including a sleeve 18 slidable upon the shaft 3 and provided with a longitudinal projecting pin 19 which is adapted to engage in openings 20 formed in the inner face of the stop wheel 11. The sleeve is held against rotation relative to the shaft 3 by means of an annular flange or collar 19' which is rigidly secured to the shaft 3 adjacent the stop wheel 11 and which is formed with an opening 20' through which the pin 19 always projects. The sleeve is actuated by means of a clutch lever 21 which embraces the sleeve, as shown in Fig. 8 and which is connected thereto by means of a pin 22 working within a circumferential groove 23 formed in the periphery of the sleeve. The clutch lever is pivoted at its forward end to a stub-shaft 24 threaded into the front wall 4, as clearly shown in Figs. 6 and 7, and the rear end is connected by a link 25 to an arm 26 rigidly secured to a vertical shaft 27. This shaft may be oscillated by means of a release lever 28 which extends through one side of the casing. It will be seen that a rotation of the vertical shaft 27 by means of the lever 28 will cause the arm 26 and link 25 to swing the clutch lever 21 so as to engage or disengage the pin 19 from the openings 20.

The main shaft is normally locked against rotation by means of a pawl 29 pivoted to a stationary arm 30 and engaging a ratchet disk 31 rigidly secured to the main shaft 3. A connecting rod 32 is secured at its lower end to the free extremity of the pawl and at its upper end to the cross bar 33 forming a part of a lock, generally designated 34. Before the machine can be operated, this cross bar must be rotated by means of a key 35' given to a voter by the election official. When the cross bar is turned to the position shown by the solid lines in Fig. 12, the connecting rod 32 will be raised and will carry the pawl 29 from engagement with the ratchet disk 31. The angular projection 34' formed upon the lower end of the cross bar 33 by coming into engagement with the connecting rod 32 prevents said cross rod being swung completely around. When the key is withdrawn from the lock 34, the pawl will drop again into engagement with the ratchet disk 31.

To prevent any one name rod from being operated more than once by any voter, when voting under the commission form of government, I provide a plurality of segmental stop plates 35 corresponding in number to the name rods 5. One of the stop plates 35 is pivoted between a pair of ears 36 formed on the bar 7 on a pivot pin 36ᵃ over each of the name rods 6, as clearly shown in Figs. 1 and 2. Each name rod is formed upon its upper name side with a longitudinal projection 37 which, when the rod is forced inwardly, is adapted to engage the lower corner of the stop plate below its pivot point and swing it from the position shown by solid lines in Fig. 2, to the position indicated by the dotted lines. Then when the rod is returned to its forward position, the corner 38 of the stop plate engages in the notch 39 and prevents the name rod being again forced inwardly.

In order that an election official may disengage the stop plates from the name rods, so that the machine will be ready for use by the next voter, I provide a rock shaft 40 which extends over the name rods at right angles thereto. This shaft is formed with a plurality of arms 41 which are adapted for engagement with laterally projecting pins 42 formed upon the stop plates 35. This shaft is journaled through a vertical support 43 and carries rigidly attached thereto an operating arm 44 located adjacent the outer face of the support 43. This arm is connected by means of a link 45 to an arm 46 connected to the vertical shaft 27. The arm 46 is formed upon a ring 47 which surrounds the shaft 27 and which may be rigidly locked thereto by means of a set screw 48. When the releasing lever 28 is swung from the position shown in Fig. 9 to the position shown in Fig. 10, the rock shaft is actuated so as to swing the arms 41 rearwardly and return all of the stop plates to their unoperated positions, as shown by the solid lines in Fig. 2. It is intended that some locking means for the releasing lever be employed so that only the election official may move said lever to swing the stop plates from locking engagement with the name rods and to disengage the clutch from the stop wheel, thus making it impossible for a voter to vote more times than allowed by the law. It is to be noted that the projections 37, which operate the stop plates, are somewhat elongated. This is to prevent the stop plates from being accidentally thrown backward while the name rods are being pushed in.

In order that only one name rod may be operated at a time, I provide a ball tube generally designated 49 and formed with a series of openings 50 upon opposite sides through which each rod extends when it is forced inwardly. Within the tube I place a plurality of balls 51 having their aggregate diameters equal to the length of the tube. Flat metal springs 52 are secured to the exterior sides of the bracket plates 53 which support the tube and serve to hold the balls normally within the tube. When a name rod is forced inwardly, the wedge shape rear extremity 54 passes through the tube 49 separating two of the balls and forcing the outermost balls into the position shown in Fig. 4. Stop plates 55 are secured to the bracket plates 53 and limit the outward movement of the springs 52 and therefore of the balls 51. The movement of the balls when a name rod passes through the tube is such as to close the openings 50 and prevent the entrance of a second rod. Expansive spiral springs 56 encircle the name rods and serve to return them to their normal positions when the pressure upon their outer ends is released.

A register shaft 57 is journaled under the name rods slightly in advance of the tube 49 and carries loosely mounted thereon a plurality of ratchet disks 58 corresponding in number to the name rods 5. These disks form part of registers, not shown, and are independently operated by means of pawls 59 connected to the name rods 5, as clearly shown in Fig. 2.

Sometimes, when there are a greater number of candidates for one office than there are name rods in one row or bank, it will be necessary to employ a number of rows or banks of name rods and in Figs. 13 and 14 I have shown how the main shafts operated by these rods may be geared to one another so that the stop wheel will be given a forward impulse each time a name rod is forced inwardly. In these figures 60 and 61 designate the main shafts which carry the ratchet disks and which are rotated by an inward movement of the name rods 6. A spur gear 62 is rigidly secured to each of these shafts adjacent one end thereof and meshes with the pinion 63. The lower shaft 61 carries the stop wheel 64 which is similar in construction to the one previously described. It will be seen that when any one of the main shafts is turned in a clockwise direction that the stop wheel, which is connected to the shaft 61, will be given a forward impulse and therefore the number of votes which may be cast by any one person are limited. More than one operation of each name rod is prevented by the pivoted stop 35 associated therewith, the name rod locking mechanism being hereinbefore described and clearly illustrated in Fig. 2.

In Fig. 15, I have shown three ball tubes 65 which are used when three rows or banks of name rods are employed. These tubes are supported between the bracket plates 66 and in order that not more than one name rod may be operated at a time, it is necessary to use a system of levers, such as shown in this figure. A main lever 67 is pivoted intermediate its ends to an arm 68 and has pivotally secured to its upper end a secondary lever 69. A flat metal spring 70 is carried by the main lever and projects over the opening in the bracket 66 opposite the lower tube 65. When a name rod is forced through the tube 65, the spring 70 will be forced outwardly and allow the balls to separate. These balls, by forcing the spring 70 against the lower ends of the main levers, cause the secondary lever 69 to be held firmly over the openings in the bracket plates 66 opposite the upper tubes. Should a rod be forced through the central tube, the lower ends of the secondary levers will be forced outwardly, causing the lower ends of the main levers to move toward the lower tube and causing the upper ends of said secondary levers to be held against the bracket plates opposite the ends of the upper tube. It will thus be seen that not more than one name rod may be forced inwardly at one time.

In Fig. 16 I have shown a system of levers to be used when four series of name rods are employed to close the ends of the ball tubes 71 when a name rod is forced through any one of the tubes. The most practical method of accomplishing this end is to provide a pair of main levers 72 pivoted intermediate their ends and having a secondary lever secured to each extremity, one of which carries a flat spring. In Fig. 17 only two ball tubes 74 are shown. In this case I provide a pair of levers 75 pivoted intermediate their ends and a set of springs 76 carried by said levers for holding the balls normally in their proper positions within the lowermost tube.

Having described the construction of my voting machine, it now remains to explain briefly the operation thereof. When a voter has established his right to vote, he is given a key which may be inserted in the lock 34 to lift the pawl 29 from engagement with the ratchet disk 31. After unlocking the machine, a name rod would be pushed in carrying the name of the candidate for whom it was desired to cast a vote. The inward movement of the name rod causes the main shaft 3 to be given a forward impulse in a clockwise direction because of the action of one of the pawls 10 upon the corresponding ratchet disk 5. The clutch pin 19 being in engagement with the stop wheel 11 causes said stop wheel to be rotated against the tension of the spring 14 so as to carry the stop screw 13 toward the stop 17. The pawl and ratchet 77 and 78 hold the main shaft against rotation in a reverse direction. The inward movement of the name rod causes the corresponding stop plate 35 to be thrown into the position shown in dotted lines in Fig. 2, and also causes one of the register disks 58 to be rotated so as to record a vote for the candidate. When the voter has cast as many votes as he is entitled to, the stop pin 13 comes into engagement with the stop 17 and prevents further rotation of the main shaft. Before the machine can be operated again, the release lever 28 must be operated by the election official so as to disengage the clutch pin from the stop wheel 11, allowing the same to return to its normal position and to rock the shaft 40 so as to cause the arms 41 to remove the stop plates from the notches 39.

When voting under the proportional representative form of government, wherein a voter can cast all of his votes for one candidate, if desired, it is necessary that the stop plates 35 be held from locking engagement with the name rods 5, and I accomplish this by providing a forked stop plate 79, clearly shown in Fig. 11. This plate is connected to the support 43 by means of a bolt 80 which passes through a slot 81 formed in the stop and through a circular opening formed in the support. When the forked stop is moved downwardly into engagement with the upper end of the arm 44 and the set screw 48 loosened, a movement of the vertical shaft 27 does not operate the rock shaft 40. The forked stop 79 holds the rock shaft in such a position that the arms 41 formed thereon, prevent the stop plates 35 dropping into the notches 39, as shown in Fig. 11. It will be understood that the stop screw 13 is so adjusted as to engage the stop 17 when the voter has cast all the votes to which he is entitled, thus locking the shaft 3 against further rotation. When the shaft 3 is thus held against rotation, the pawls 10 engaging the teeth of the ratchet disks 5 prevent operation of the name rods until the release lever 28 is operated by an election official so as to disengage the clutch pin 19 from the stop wheel 11 and permit the latter to return to normal position under the influence of the spring 14.

From the foregoing description taken in connection with the accompanying drawings, it will be seen that I have provided a very simple and practical voting machine which lends itself to voting under different forms of government and which may be easily enlarged to accommodate any number of candidates.

While I have shown and described the preferred embodiment of my invention, it will be understood that minor changes in construction, combination and arrangement of parts may be made without departing from the scope and spirit of the invention as claimed.

Having thus described my invention, I claim:—

1. In a voting machine a plurality of name rods slidably mounted, a main shaft journaled at right angles to said name rods, means whereby a longitudinal movement of any name rod will impart a rotational movement to the main shaft, a spring returned stop wheel loose upon said main shaft, and clutch mechanism for locking the stop wheel to the main shaft.

2. In a voting machine, a plurality of slidable name rods, a main shaft, means carried by the name rods for rotating said main shaft in one direction, means normally locking said shaft against rotation in the opposite direction, means normally tending to return said shaft to initial position, and adjustable means for limiting the rotational movement of said shaft.

3. In a voting machine, a plurality of name rods slidable longitudinally, a main shaft journaled at right angles to said rods, means whereby a longitudinal movement of any name rod will impart a rotational movement to the main shaft, a spring influenced wheel rotatable upon said main shaft, a clutch mechanism for locking the wheel to the main shaft, and means for limiting the rotational movement of said wheel in both directions.

4. In a voting machine, a plurality of name rods slidably mounted, a main shaft journaled at right angles to said name rods, means whereby a longitudinal movement of any name rod will impart a rotational movement to the main shaft, a spring influenced wheel rotatable upon said main shaft, a clutch mechanism for locking the wheel to the main shaft, means for limiting the rotational movement of said wheel in one direction, and adjustable means for limiting the rotational movement of said wheel in the opposite direction.

5. In a voting machine, a main shaft, a spring influenced stop wheel rotatably mounted upon said shaft and having a plurality of peripheral openings, spaced stationary stops, a projection fixed to said wheel adapted to engage one of said stops to limit the movement of said wheel under the influence of its spring, and a stop screw adjustable within said openings and adapted to engage the other stationary stop to limit the movement of said wheel in the opposite direction.

6. In a voting machine, a plurality of slidable rods having wedge shaped ends, and means for preventing more than one rod being actuated at a time, said means including a plurality of tubes having a plurality of openings arranged in diametrically opposed pairs through which the name rods are adapted to project when actuated, a plurality of balls mounted within the tube and having their aggregate diameters equal to the length of the tube, means for limiting the outward movement of the balls, a plurality of pivoted levers having their free ends disposed adjacent the ends of said tubes and adapted to be operated by the balls in one tube when one of said slidable rods is actuated to prevent separation of the balls in the other tubes, and means associated with said levers for normally retaining said balls in contact with each other within said tube.

7. A voting machine comprising a plurality of slidable name rods arranged in rows, and means for preventing more than one rod being actuated at a time including a plurality of tubes having openings therethrough adapted to receive said rod, a plurality of spring pressed balls movable within said tubes, and a plurality of levers operable by the balls in one tube to prevent the separation of the balls in any other tube.

8. In a voting machine a plurality of slidable name rods, an apertured bar pivotally receiving the inner extremity of said name rods, segmental stop plates pivotally secured to said bar and adapted to coöperate with said name rods to prevent inward movement of the latter, and longitudinal projections on said rods adapted to engage the corners of said segmental plates to swing the latter into locking engagement with said name rods.

9. In a voting machine, a plurality of slidable name rods, an apertured bar slidably receiving the inner extremities of said rods, a segmental plate pivotally secured to said bar above each of said name rods, said rods having notches adapted to receive the corners of said plates to lock said rods against inward movement, longitudinal projections formed on said rods adapted to engage the lower corners of said plates to swing the latter upon their pivotal axes when said rods are moved inwardly, laterally projecting pins secured to said segmental plates, a shaft rotatably mounted above said rods, and arms carried by said shaft adapted to engage said pins to release said plates from said rods.

10. In a voting machine, a plurality of slidable rods, a main shaft rotatable by a movement of said rod, a wheel rotatably mounted on said main shaft, adjustable means for limiting the rotational movement of said wheel, a clutch mechanism for locking said wheel for rotation with said main shaft, a plurality of pivoted plates operable by said name rods to lock the latter against inward movement, and means for simultaneously clutching said main shaft with said wheel and releasing said plates from locked engagement with said rods.

11. In a voting machine, a name rod, a support for the inner extremity of said rod slidably receiving the latter, said name rod having a notch, a plate pivotally secured to said support, a projection on said name rod adapted to engage said plate to swing the latter when said rod is moved inwardly to permit said plate to drop into said notch when said rod returns to initial position, a laterally projecting pin on said plate, and means for engaging said pin and retaining said plate in inoperative position, said means including a rotatable shaft, an arm secured thereto, a slidable member adapted to engage and secure said arm against movement, and means for securing said slidable member in adjusted position.

12. In a voting machine, a plurality of rows of longitudinally slidable name rods, a shaft journaled below each row of name rods, means whereby a longitudinal movement of any name rod will impart a rotational movement to the shaft disposed thereunder, stopping means associated with one of the shafts for locking the shaft against movement after a predetermined number of operations of the name rods, and means connecting the shafts whereby the latter are simultaneously locked against operation subsequent to a predetermined number of operations of the name rods.

13. In a voting machine, a plurality of name rods, a shaft journaled below said name rods, means whereby a longitudinal movement of any name rod will impart a rotational movement to the main shaft, means controlled by a voter for locking and unlocking said main shaft, means operable by said name rods to lock the latter against operation, and means controlled by an election official for returning the name rod operable means to initial position after an operation thereof.

In testimony whereof I affix my signature in presence of two witnesses.

FRANK SIMPSON.

Witnesses:
F. S. CARROLL,
N. L. RANNELLS.